T. POWERS & C. C. GILMAN.
SAFETY-CARS.
No. 193,671. Patented July 31, 1877.
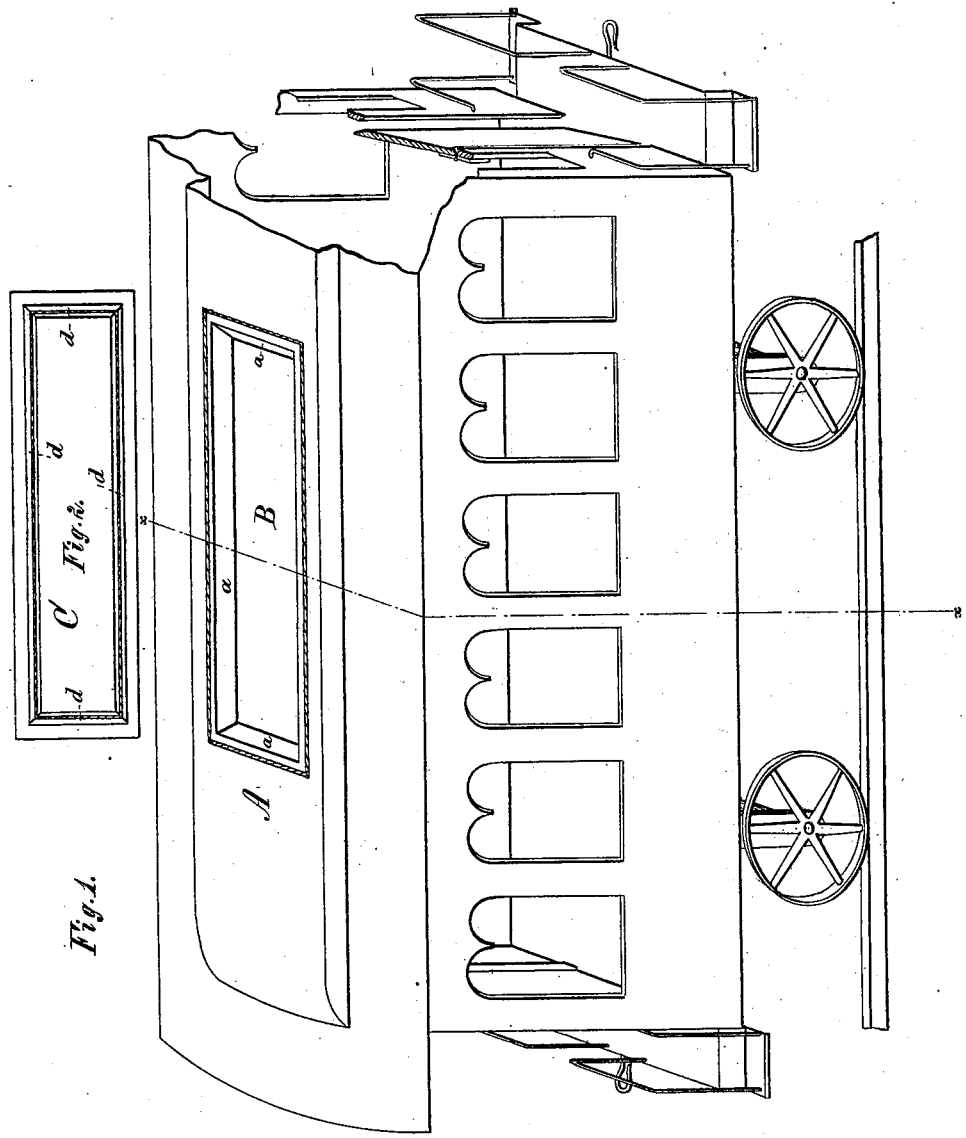
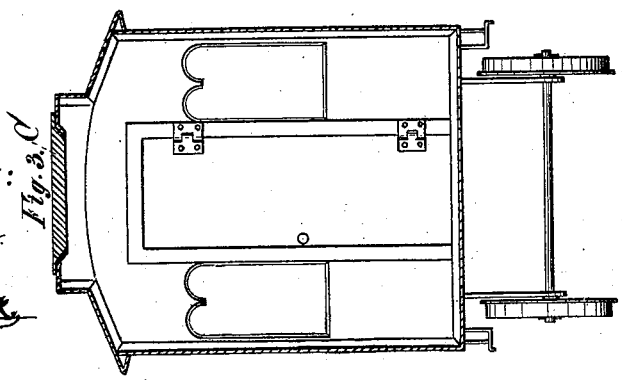
Witnesses:
Theodore G. Hoster
B. S. Clark
Inventor:
Titus Powers
Charles C. Gilman
By H. Heich
their atty.

UNITED STATES PATENT OFFICE.

TITUS POWERS, OF NEW YORK, N. Y., AND CHARLES C. GILMAN, OF ELDORA, IOWA.

IMPROVEMENT IN SAFETY-CARS.

Specification forming part of Letters Patent No. 193,671, dated July 31, 1877; application filed November 24, 1876.

*To all whom it may concern:*

Be it known that we, TITUS POWERS, of the city, county, and State of New York, and CHARLES CARROLL GILMAN, of Eldora, Hardin county, and State of Iowa, have jointly invented a new and useful Improvement in Railway-Car Bodies, of which the following is a specification, reference being had to the accompanying drawings, forming a part of the same.

Figure 1 is a perspective view of a railway-car, embodying, together with Fig. 2, our improvement; and Fig. 3 is a cross-section of said car on line $x$ $x$, Fig. 1.

It frequently occurs in railroad disasters, when the cars are thrown from the track and overturned or set on fire, that the passengers find themselves imprisoned within them, with no opening from which escape is possible. When a car is merely thrown over upon its side, escape by the windows in the upper side is difficult, and often impracticable, even if the heavy plate glass commonly used in cars is broken out, and the doors are usually pinched and held firmly between the sides of the door-casings.

The object of our invention is to provide a way of escape in such disasters, by constructing the body with an opening in the roof, covered by a loose detached hatch or covering, which, while it is retained by its own gravity alone securely in place, and made to effectually close the opening so long as the car-body remains upright, will be thrown off by the overturning of the car.

The general construction of the car-body need not be described, as it does not differ from that of cars in common use.

A is the roof of the car, in which there is a large opening, B. This opening should be sufficiently large to permit the largest person to pass easily through it—say two or three feet by six or eight feet. C is a hatch or cover, which fits over and into said opening, so as to completely close the same, with air and water tight joints around its edges. These joints are made so that, while the hatch shall be retained in its place only by gravity, the hatch will be free to be thrown off by the turning over or upon one side of the car-body.

The drawings represent a frame with beveled inner faces $a$ around its four sides, fixed in the opening, and the hatch with correspondingly-beveled projections $d$ on its under face, which extend down and fit snugly into the said frame.

The hatch is made of such material or construction that it will, by gravity, be held in place in its seat against whatever tendency there may be to displace it from the motion of the car while remaining upright. The hatch will thus be held by its own gravity securely in place while the car is upright; but if it is overturned or thrown on its side the said hatch, not being attached to the roof, will be thrown off by the motion of the car and the gravity of the hatch, leaving an open way of escape. At one end of Fig. 1 the upper corner of the roof and sides and ends of the body is cut away to show the form of the door and jambs, which is recommended. The edges of the door at the sides and top are beveled to an angle, preferably of forty-five degrees, and the jambs into which the door shuts are correspondingly beveled.

The roof of a car may be provided with any number of these hatches that shall be deemed desirable, or a single hatch may be made to extend the entire length of the upper roof.

We are aware that Letters Patent were issued to Albert Potts in 1837 for a car the roof of which, and a portion of the sides and ends, was detachable, the line of detachment being several inches below the angle formed by the roof and sides and ends.

We do not claim, broadly, a detachable roof, as described in the said patent, limiting our claim to the hatchway and hatch in the top of the roof of the car, as described.

We are aware that cars have been furnished with detachable hatches in the roof; but we are not aware that in any case these hatches have been constructed and adapted to retain by gravity alone their places in the aperture which they have been designed to cover. In all cases some mechanical devices have been employed, whereby the hatches have been secured in place, and which have required to be manipulated or moved to detach the hatch from the roof.

What we claim, and desire to secure by Letters Patent, is—

A railway-car body, provided with a large opening in the top of the roof that is closed by a detached hatch or cover that fits into the opening with tight joints, and so constructed and arranged that it will by gravity alone be kept in place so long as the car remains upright, but will be thrown off by the overturning of the car, substantially as and for the purpose described.

Witness our hands this 13th day of November, 1876.

TITUS POWERS.
 CHARLES CARROLL GILMAN.

Witnesses to Titus Powers:
 B. S. CLARK,
 WM. T. FARNHAM.

Witnesses to Charles Carroll Gilman:
 HENRY L. HUFF,
 S. A. REID.